United States Patent [19]

Claisse et al.

[11] 3,731,212

[45] May 1, 1973

[54] AUTOMATIC PHASE ADJUSTMENT SYSTEM FOR THE DEMODULATION OF SINGLE SIDEBAND TRANSMITTED CODED RHYTHMIC SIGNALS

[75] Inventors: Jacques B. Claisse, Paris; Moni S. Mitrani, La Varenne Saint-Maur; Jean-Rene Berland, Paris, all of France

[73] Assignee: Societe Anonyme de Telecommunications, Paris, France

[22] Filed: Mar. 24, 1972

[21] Appl. No.: 237,793

[30] Foreign Application Priority Data

Jan. 14, 1972 France ................................7201315

[52] U.S. Cl. ..................329/50, 179/15 BP, 329/122

[51] Int. Cl. ..............................................H03d 1/24

[58] Field of Search .......................329/50, 122, 123, 329/146; 179/15 BC, 15 BP, 2 DP

[56] References Cited

UNITED STATES PATENTS

| | | | |
|---|---|---|---|
| 3,518,680 | 6/1970 | McAuliffe | 179/15 BC |
| 3,225,316 | 12/1965 | Saraga | 329/50 |
| 2,943,193 | 6/1960 | Webb | 329/146 |

*Primary Examiner*—Kathleen H. Claffy
*Assistant Examiner*—David L. Stewart
*Attorney*—Abraham A. Saffitz

[57] ABSTRACT

A system for demodulating coded bipolar rhythmic signals having a rhythm frequency $f_1$ and which are frequency-transposed and single-sideband transmitted simultaneously with a carrier current of frequency $f_0$, said system comprising two balanced demodulators whose signal inputs receive said signals and whose control inputs are controlled by carrier currents having same said frequency $f_0$ but which are out of phase with one another, said system comprising means for deriving from said transmitted carrier current a main carrier current of frequency $f_0$ and means for additively combining the other signals delivered by said demodulators, said system being characterized by means controlling the phase of said main carrier current, such means being controlled by a slowly varying control voltage obtained from the difference between the amplitude of two auxiliary signals having a frequency twice the rhythm frequency $f_1$ and obtained from the respective outputs of said demodulators; means for deriving from said phase-controlled main carrier current two further carrier currents which are out of phase with one another by a predetermined phase angle, and means for applying said out-of-phase carrier currents to the respective control inputs of said demodulators.

8 Claims, 6 Drawing Figures

AUTOMATIC PHASE ADJUSTMENT SYSTEM FOR THE DEMODULATION OF SINGLE SIDEBAND TRANSMITTED CODED RHYTHMIC SIGNALS

This invention relates to a novel demodulation system for single-sideband carrier current transmitted "rhythmic" coded signals — i.e., signals frequency transposed at the transmitting end of a communication circuit by means of a carrier current, with suppression of one of the frequency sidebands produced by such transposition. The system is of use for bivalent coded signals, e.g. binary data signals having the values 0 or 1, of a constant individual length T after their previous translation (before frequency transposition) into bipolar coded signals — i.e., signals having one of the three values +1, 0 and −1 — by the known method of modulo−2 interlaced bipolar encoding.

A brief outline will first be given of the definition of the latter code and the procedure for translating conventional binary code into modulo−2 interlaced bipolar code. According to known principles, the aim of a conversion of this kind is to suppress the D.C. component of the original binary signals and to obtain for the translated signals an energy distribution in the spectrum of frequencies suitable for their subsequent processing and transmission. The translated signals are then frequency-shifted, if necessary after further frequency filtering, by modulation by a carrier current of fixed frequency $f_o$, then filtered to suppress one of the frequency sidebands, as a rule the above-$f_o$ band. Also, after translation but before frequency transposition, the signals should be devoid of D.C. component and have little energy at low frequencies, to keep components of frequencies near $f_o$ out of the frequency-transposed signals.

The modulo-2 interlaced bipolar code meets this condition exactly and its advantages over conventional binary code (0, 1) have been described in a paper by E.R. Kretzmer, published in the review I.E.E.E. Transactions, Vol. Com-14, No. 1, Feb. 1966, pages 67 and 68.

It will just be recalled here that, to be translated from conventional binary code to this kind of bipolar code, the original sequence of signals in the conventional code is divided into two partial sequences, the first consisting of odd-rank elements, evenrank elements being systematically converted into 0 elements, the second partial sequence consisting or even-rank elements, the odd-rank elements being systematically translated into 0 elements, whereafter each of the two partial sequences is translated into simple bipolar code — i.e., the 1 elements assume positive and negative polarity alternately in each sequence. Adding the two partial sequences thus translated gives the modulo-2 interlaced bipolar signal.

Also, of course, the original sequence in ordinary binary code can be restored from the translated form just described by rectification of the translated form — i.e., by replacement of all the (+1) and (−1) elements by elements of the same algebraic sign, the 0 elements remaining unchanged.

Assuming a completely random composition of the original train, the spectral distribution of the energy of the bipolar train thus provided is very suitable for use in a transmission circuit; if $f_1$ denotes the "rhythm" frequency — i.e., the quantity 1/ T — the translated bipolar sequence has zero spectral density at zero frequency, maximum density near the frequency $f_1/4$, zero density at frequency $f_1/2$, then another density peak, smaller than the previous peak, near frequency $3f_1/4$, and zero density again at frequency $f_1$. Also, of course, low-pass filtering suppression of frequencies above $f_1/2$ in the translated sequence makes substantially no reduction in its useful information content, which can therefore be preserved by retention just of the frequency band $(0, f_1/2)$.

After a frequency transposition by means of a carrier current of frequency $f_0$, and assuming that the retained sideband is the bottom sideband of the frequency-shifted signals, the band obtained for the latter is $(f_0 - f_1/2, f_0)$, with substantially zero spectral density near the band limits. Because of its relatively narrow bandwidth of $f_1/2$, this band is very suitable for transmission, e.g. over a telephone circuit.

To simplify description, it will hereinafter be assumed by way purely of explanation that $f_0$ is 3,000 Hz and $f_1$ is 4,800 Hz (data transmission speed of 4,800 bits/second). The band $(f_o - f_1/2, f_o)$ therefore spreads from 600 to 3,000 Hz, a very good position for telephone cable transmission particularly since, as already shown, the energy of frequency components near 3,000 Hz is low, such frequency being the zero frequency in the transposed encoded sequence.

When the coded signals are transmitted from the transmitting end of a communication circuit with frequency transposition, they must be given a reverse frequency transposition at the receiving end and, if necessary, a reverse code translation of the translation given at the transmitting end. A reverse frequency transposition operation is performed by a demodulator energized by a local carrier current of frequency $f_0$ which is usually obtained from a pilot current of the same frequency $f_0$ transmitted over the circuit, with appropriate phase adjustment for correct demodulation. Phase adjustment presents no difficulties when there is a fixed link between transmitter and receiver, since a once-for-all adjustment can be made when the link is taken into use; unfortunately, phase adjustment becomes impossible when the link varies, e.g. in the case of an automatic telephone system in which the link can extend by more than one route depending on the state of traffic or wherein a single receiving element may be consecutively connected via the network to a number of transmitters in different parts of the network.

The invention makes use of the experimentally confirmed fact that a large component whose frequency is twice the rhythm frequency $f_1$ can be derived from the output of a demodulator receiving frequency-transposed coded signals from the circuit or network and energized by a local carrier current of frequency $f_0$. Of course, the amplitude of this component depends upon the local carrier current of frequency $f_0$ being in a fairly favorable phase. If two demodulators are used which receive the same signals from the network and if these two detectors are respectively energized by one and the other of two carrier currents of frequency $f_0$ out of phase with one another by a relatively small angle, e.g. ± 20°, the output products at the frequency $f_1$ of the demodulators provide after rectification components of frequency $2f_1$ which can be of the same amplitude only if the phase differences between the carrier currents are symmetrical with respect to the optimum phase position for demodulation. An automatic control facility controlled by the difference between the amplitudes of the components of frequency $2f_1$ therefore acts on the phase of the local carrier current of frequency $f_0$ until the required symmetry is achieved, thus providing optimum demodulation of the transposed coded signals — in this case, signals whose frequency is below $f_0$.

For this result to be achieved constantly, the energy distribution in the frequency spectrum of the coded signals applied to the inputs of the two detectors must be the one corresponding to random coded signals. This result can of course be achieved by the use at the transmitting end of a scrambler serving to replace the original order of the coded binary signals by a quasi-random order, should the binary signals have any marked correlation. A facility for carrying out the converse operation must of course then be provided at an appropriate part of the receiving system. These features, which are known, do not relate to the invention and so will not be further mentioned hereinafter.

An advantage of the system according to the invention is that, since the transposed binary signals use modulo-2 interlaced bipolar code, very simple means can be used at the receiving end of the system to restore the binary data signals from the demodulation coded signals, since the bipolar sequence can, as already stated, be restored to the conventional coded binary sequence just by rectification.

This invention provides a system for detecting coded bipolar rhythmic signals which have a frequency rhythm $f_1$ and which are frequency transposed and single-sideband-transmitted simultaneously with a carrier current of frequency $f_0$, the system comprising two balanced demodulators whose signal inputs receive the signals, the demodulators being respectively controlled by carrier currents which have the same frequency $f_0$ as one another but which are out of phase with one another, the system comprising means for deriving from the transmitted carrier current a main carrier current of the frequency $f_0$ and means for additively combining the signals output by the demodulators, the system comprising:

means controlling the phase of the main carrier current, such means being controlled by a slowly varying control voltage obtained from the difference between the amplitudes of two auxiliary signals whose frequency is twice the rhythm frequency $f_1$ obtained from the respective outputs of the two demodulators;

means for deriving from the phase-controlled main carrier current two carrier currents which are out of phase with one another by a predetermined phase angle, and means for applying the out-of-phase carrier currents to the respective control inputs of the demodulators.

According to a first feature of the invention, the auxiliary signals of frequency $2f_1$ are produced from the detector output signals by full-wave rectification followed by a narrow frequency passband filtering centered on the frequency $2f_1$ which is twice the rhythm frequency $f_1$.

According to another feature of the invention, the auxiliary signals of frequency $2f_1$ are obtained from the demodulator output signals by triggering a monostable delivering signals of a length near ¼ $f_1$ and by filtering such signals by a narrow-pass filter centered on the frequency $2f_1$ which is twice the rhythm frequency $f_1$.

In both cases the demodulator output signals are submitted to low-pass filtering to limit their passband to half the rhythm frequency $f_1$ — *i.e., to* $f_1/2$ —and each auxiliary signal of frequency $2f_1$ is rectified to provide a slowly varying D.C. voltage proportional to signal amplitude.

The operation and advantages of a system according to the invention will become more clearly apparent from the following detailed description, given with references to the accompanying drawings, wherein.

Figure 1:
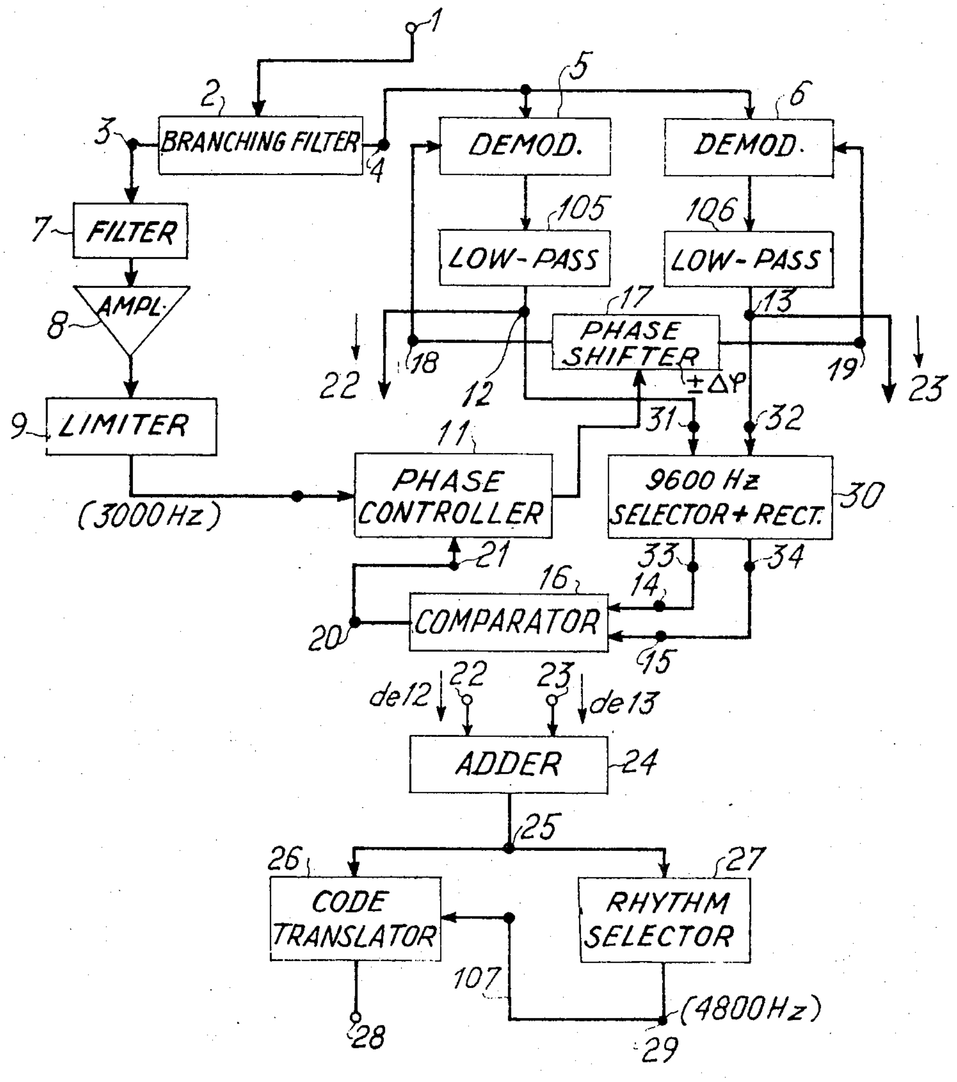
FIG. 1 is a single-wire diagram showing the underlying principles of the system according to the invention.

Referring to FIG. 1, an input terminal 1 is connected via a matching device to a telephone line over which coded frequency-transposed signals, e.g. data signals, are received. The signals received at input 1 are frequency-routed by a branching-filter 2 to one or the other of outputs 3, 4 thereof. The filter 2 serves to prevent the transmission to its output 4 of currents at the carrier frequency $f_0$, such currents going to the output 3 of filter 2, whereas coded information signals (which, as seen previously, are assumed here to have a frequency lower than $f_0$) go to output 4. The latter is connected to the signal inputs of both balanced demodulators 5, 6. The filter 2 is not essential for operation of the installation and can, if necessary, be replaced by a direct connection between the terminals 1, 3 and 4 of FIG. 1.

The carrier current of frequency $f_0$ which is received at input 1 and which is mixed with components of other frequencies also received at input 1, goes from the output of filter 2 to the input of a filter 7 having a narrow frequency passband centered on the carrier frequency $f_0$ (which in this case is 3,000 Hz). The current output by filter 7 goes to the input of an amplifier 8 whose output is connected to the input of a limiter 9; the output thereof supplies input 10 of a controller 11 of a kind to be described hereinafter.

The outputs of demodulators 5, 6 are respectively connected to the inputs of low-pass filters 105, 106; filters 105, 106 have a cut-off frequency of 2,400 Hz and their outputs 12, 13 are connected, in each case via an element 30 acting as frequency selector and rectifier, to inputs 14, 15 respectively of an amplitude comparator 16 of a kind to be described hereinafter.

Phase controller 11 has its output connected to the input of a phase shifter 17 having two outputs 18, 19 respectively connected to the control inputs (demodulator carrier current inputs) of demodulators 5, 6. The function of phase shifter 17 is to derive from the main carrier current output by phase controller 11 an applied to the input of phase shifter 17, two other carrier currents out of phase with one another by a relatively small angle, e.g. ± 20°. The phase shifter 17 can be of any known kind.

The difference between the voltages applied to inputs 14, 15 of amplitude comparator 16 appears at output 20 of comparator 16 in the form of a voltage which is applied to control input 21 of phase controller 11.

The demodulated signals output by the low-pass filters 105, 106 are applied not only to inputs 14, 15 of comparator 16 but also to two inputs 22, 23 of an adder 24 whose output 25 energizes the input of a code translator 26 and the input of a rhythm frequency selector 27. The elements 26, 27 deliver at their respective outputs 28, 29 the detected signals from the low-pass filters 105, 106 restored to conventional binary code, and a signal at the rhythm frequency which is needed for operation of the translator 26 and which can also be applied to any subsequent utilization circuit.

Elements 2, 5, 6, 7, 8, 9, 17, 105 and 106 of FIG. 1 can be of any known kind and need no special description, but the elements such as phase controller 11, comparator 16 and selector 30 will be described in greater detail hereinafter.

Referring first to FIG. 1, which shows how selector 30 is connected, the same has two inputs 31, 32 respectively connected to the outputs 12, 13 of low-pass filters 105, 106. Selector 30 comprises two similar halves, one having an input 31 and an output 33 and the other having an input 32 and an output 34. Consequently, only one half of the selector 30 need be described.

Figures 2, 3:
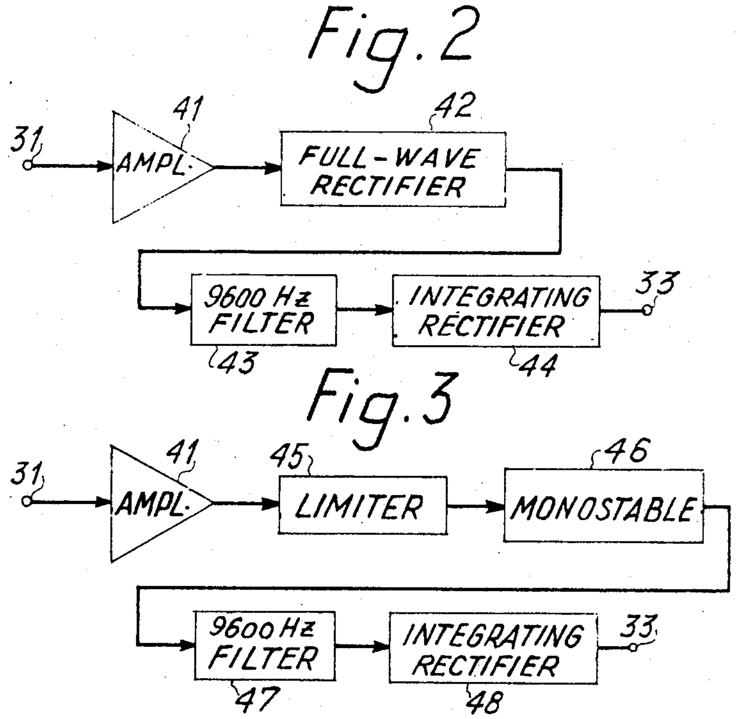
FIG. 2 shows a first form of the system for producing and rectifying the auxiliary signals of frequency $2f_1$.
FIG. 3 shows a second form of a system of the kind shown in FIG. 2.

Referring now to FIG. 2, input 31 of 30 is connected to the input of an amplifier 41. The signals output thereby are rectified by a fullwave rectifier 42. The output signals therefrom, all of which are of the same polarity, go to the input of a narrow-pass filter 43 centered on the frequency $2f_1$ which in this case is assumed to be 9,600 Hz. The output of filter 43 goes to the input of a full-wave rectifier 44 feeding an RC circuit having a long time constant (integrating rectifier) and delivering at its output 33 a slowly varying D.C. voltage of a value proportional to the amplitude of the 9,600 Hz output signal from the filter 43.

Referring now to FIG. 3, there can be seen another form of a system which can be used instead of the system in FIG. 2 between points 31 and 33 (or 32 and 34) of FIG. 1. In FIG. 3 input 31 is connected to the input of an amplifier 41 whose output is connected to the input of an amplitude limiter (peak clipper) 45; the output thereof actuates a monostable 46 which at each passage through zero of its input signals in either direction outputs a signal having a length of 1/19 200 second — i.e., $1/4f_1$ — so as to output a power peak at 9,600 Hz. The output of monostable 46 goes to the input of a narrow-pass filter 47 centered on 9,600 Hz whose output in turn is fed to an integrating rectifier 48 similar to the integrating rectifier of FIG. 2; rectifier 48 delivers at its output 33 a slowly varying D.C. voltage whose value is proportional to the amplitude of the 9,600 Hz signal output by filter 47. The latter amplitude is proportional to the number of passages through zero per unit of time of the signal applied at input 31 and can therefore be considered as a measure of the amplitude of the 9,600 Hz component derived from the output of demodulator 5 (FIG. 1).

Figure 4:
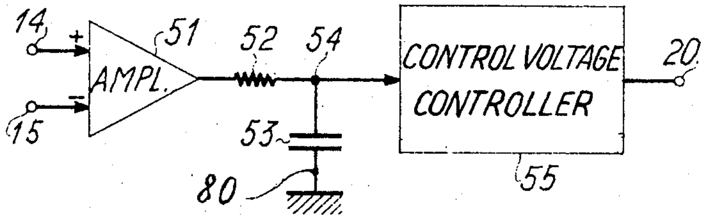
FIG. 4 shows an embodiment of an amplitude comparator which outputs a voltage proportional to the difference between the D.C. voltages produced by rectification of the auxiliary signals of frequency $2f_1$.

Referring now to FIG. 4, showing the construction of comparator 16 of FIG. 1, the same comprises a D.C. difference amplifier 51 whose inputs 14, 15 are connected to outputs 33. 34 respectively of selector 30 of FIG. 1. In FIG. 4 the output of amplifier 51 is connected to a time-constant network formed by a resistance 52 and a capacitor 53, so that a slowly varying D.C. voltage proportional to the difference between the voltages existing at points 33, 34 is provided at point 54.

To provide at point 20 of FIG. 1 a more suitable control voltage for phase controller 11, the voltage received at output 51 in FIG. 4 is also acted on by a controller 55 whose operation will be described hereinafter and which delivers at its output 20 (FIGS. 1 and 4) the control voltage needed for phase controller 11 of FIG. 1.

Referring to FIG. 1, the signals delivered at outputs 12, 13 of the low-pass filters 105, 106 are also applied to inputs 22, 23 of an adder 24 whose output 25 is connected to a code translator 26 and to a rhythm frequency selector 27, the rhythm frequency being in this case 4,800 Hz. The function of elements 26, 27 is so to combine the signals output at outputs 12, 13 as to extract therefrom the coded information received at input 1 in FIG. 1 and the rhythm frequency of such information, since the rhythm frequency usually has to be available, e.g. for the purposes of subsequent data-processing equipment. Actually, the elements 24 26, 27 of FIG. 1 do not form part of the invention; nevertheless, a simple form of such elements will be described hereinafter.

Figure 5:
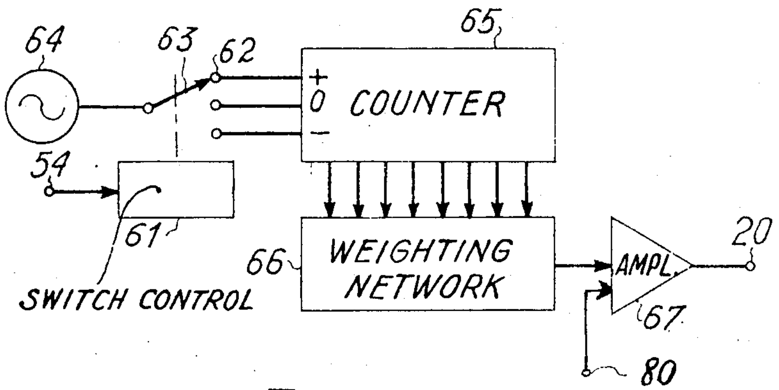
FIG. 5 shows a system for processing the voltage output by the amplitude comparator so as to prepare from the latter voltage a control voltage for the phase controller, such control voltage being free from noise and transient disturbance.

REferring to FIG. 5, showing the construction of controller 55 of FIG. 4, the voltage delivered by amplifier 51 of FIG. 4 is applied through resistance 52 to a point 54 which can be seen in FIGS. 4 and 5. A device 61 controlled by the voltage from point 54 controls a 3-position switch 62 which takes up on or the other of its three positions, here called +, 0 and −, according as the voltage applied at point 54 is greater than a predetermined value $+\epsilon$ or somewhere between $+\epsilon$ and $-\epsilon$ or less than $-\epsilon$. To make the description clear, the switch 62 is shown in the form of a 3-position selector whose moving contact 63 is connected to a local oscillator 64 having a frequency anywhere between a few tenths and a few tens of Hz. Contact 63 takes up the + position when the voltage applied to position 54 is positive and exceeds a threshold value $\epsilon$, or the — position if the latter voltage is negative and exceeds the same threshold. If the absolute voltage value is below the threshold the moving contact 62 goes to its 0 or neutral position.

The fixed + and − contacts of the switch 62 are connected to the forward and backward counting inputs respectively of an 8-stage binary counter 65 which counts the signals from oscillator 64 forwards or backwards, the 0 contact of switch 62 being isolated. The outputs of each stage of counter 65 are connected to the 8 inputs of a weighting network 66 which is a resistance ladder network adapted to weight the voltages received from the various stages of counter 65 with a multiplication factor equal to the reciprocal of a power of 2 equal to the rank of the particular stage concerned. Network 66 outputs to the input of a current amplifier 67 which delivers the required control voltage at its output 20.

Clearly, therefore, the voltage output at place 20 can vary in a range of 0 to 255 ($2^8 = 256$) but is unaffected by any accidental disturbances in the voltage received at point 54 yet varies substantially proportionally to the latter voltage, at least when the same exceeds a desired threshold value.

Figure 6:
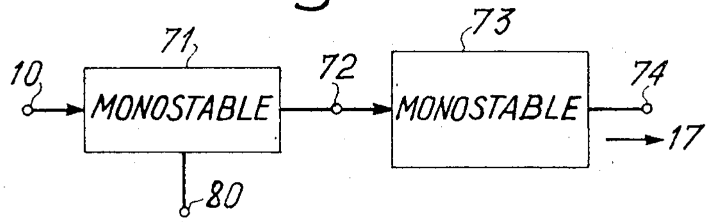
FIG. 6 shows an embodiment of a phase control facility of use in the system shown in FIG. 1.

Referring now to FIG. 6, which shows the construction of the phase controller 11 of FIG. 1, a rectangular wave-form signal of frequency $f_0$ received at point 10 in FIGS. 1 and 6 is applied to the input of a first monostable 71; the leading edge of each period of the signal applied at position 10 triggers monostable 71 which delivers a rectangular signal at its output 72. The length of the latter signal is determined by a time-constant circuit comprising e.g. a capacitor and a resistance; one end of the resistance is connected to a reference or "-ground" potential point 80 visible in FIGS. 4, 5 and 6. The length of the output signal from bistable 71 (FIG. 6) varies in dependence upon the value of the slowly varying D.C. voltage received at point 20 (FIGS. 4 and 6) from the control voltage controller 55 (FIG. 4), so that the trailing edge of the output signal from monostable 71 has a position in time varying with the value of the control voltage.

The trailing edge of each signal output by monostable 71 is applied to a second monostable 73 which can be seen in FIG. 6 and which outputs for each signal received from monostable 71 a signal of a constant length substantially equal to $1/2f_0$ — *i.e.*, 1/6,000 sec. in the present case. The first monostable 71 is so devised that the range of variation of control voltage applied at point 20 is such as will give a total variation of the length of the resulting pulse of at least $1/2f_0$, so that the phase of the sequency of signals delivered at output 74 of monostable 73 can vary by at least 180°. The signals delivered at output 74 in FIG. 6 go to phase shifter 17 of FIG. 1; this is a conventional kind of circuit comprising e.g. capacitors and resistances and using a monostable circuit, with one input and two outputs 18, 19 delivering two voltages of frequency $f_0$ at a fixed phase difference $2\Delta\phi$, e.g. of $\pm 20°$. These two voltages are applied to control the two demodulators 5, 6 respectively of FIG. 1.

As already stated, the demodulated signals output by demodulators 5, 6, which signals have very similar wave forms thanks to the relatively small phase difference between the control voltages of frequency $f_o$ applied to 5 and 6 from points 18 and 19 of FIG. 1, are added in an adding network 24 which delivers at its output 25 demodulated signal equivalent to the signal which would be produced at the output of a single demodulator controlled by a voltage of frequency $f_o$ having the same phase as the mean phase of the voltages which the phase shifter 17 delivers at its outputs 18, 19.

From output 25 of adder 24 the demodulated signal — a modulo-2 interlaced bipolar code signal — goes to the input of a code translator 26 which delivers at its output 28 an equivalent signal in conventional binary code.

To this end, translator 26 also receives via connection 107 a "rhythm" signal at the frequency $f_1$, such signal being provided by "rhythm selector" 27 which will be discussed hereinafter. As already stated, translator 26 operates basically by rectifying the signal received from adder output 25; those elements of such signal which have a given polarity, e.g. a positive polarity, are transmitted unchanged but elements of a polarity opposite to the previous polarity are given polarity reversal.

The translator 26 can be embodied in many ways, using any known kind of circuit for providing the required code translation.

The signal received at position 25 also goes to the input of the rhythm selector 27, which serves to extract from the spectrum of the latter signal the component of frequency $f_1$ — in this case 4,800 Hz — which is of course present in such signal in cases where the distribution of the coded signals received at input 1 is a truly random one. The element 27 can be embodied as required; preferably — but not exclusively — selector 27 takes the form of a rectifier followed by a filter having a narrow frequency passband centered on the frequency $f_1$. The latter filter can be followed by an amplitude limiter which is in turn followed, if necessary, by a fixed phase-shift network so that output 29 of selector 27 provides translator 26 via connection 107 with signals timed appropriately for proper operation of translator 26.

What we claim is:

1. A system for demodulating coded bipolar rhythmic signals having a rhythm frequency $f_1$ and which are frequency-transposed and single-sideband transmitted simultaneously with a carrier current of frequency $f_0$, said system comprising two balanced demodulators whose signal inputs receive said signals and whose control inputs are controlled by carrier currents having same said frequency $f_0$ but which are out of phase with one another by a predetermined phase angle, said system comprising means for deriving from said transmitted carrier current a main carrier current of frequency $f_0$ and means for additively combining output signals delivered by said demodulators, said system being characterized by:

means controlling the phase of said main carrier current, such means being controlled by a slowly varying control voltage obtained from the difference between the amplitude of two auxiliary signals having a frequency twice the rhythm frequency $f_1$ and obtained from the respective outputs of said demodulators;

means for deriving from said phase-controlled main carrier current two further carrier currents which are out of phase with one another by said predetermined phase angle, and means for applying said out-of-phase carrier currents to the respective control inputs of said demodulators.

2. A system as claimed in claim 1, in which said auxiliary signals are obtained by rectification of the respective output signals of said demodulators filtered by low-pass filters; in which the rectified signals are submitted to a narrow passband filtering in filters having their passband centered on frequency $2f_1$; an in which said auxiliary signals are subsequently rectified to provide two further slowly varying D.C. voltages.

3. A system as claimed in claim 1, in which said auxiliary signals are respectively produced by the triggering, initiated by the output signals of each demodulator filtered by a low-pass filter, of each of two monostables outputting signals which are thereafter submitted to narrow passband filtering in a filter having its passband centered on frequency $2f_1$, whereafter said auxiliary signals are rectified to provide two further D.C. voltages of slowly varying amplitude.

4. A system as claimed in claim 1, in which said low-pass filtered demodulator output signals are applied to an adder network feeding a code translator and a rhythm frequency selector circuit.

5. A system as claimed in claim 1, in which said slowly varying control voltage is obtained from the output of a comparator comprising a difference amplifier whose inputs are respectively energized by one and the other of two further slowly varying D.C. voltages respectively produced by rectification of said two auxiliary signals.

6. A system as claimed in claim 5, in which said slowly varying control voltage is obtained from said comparator output by way of a control voltage controller device comprising a three-position switch controlled by said comparator output voltage and connecting a local oscillator to one or the other of the forward and backward counting inputs of a multistage binary counter or to neither of such inputs, according to the value and polarity of said comparator output voltage, said control voltage controller device also comprising a weighting network deriving from said counter a D.C. voltage whose amplitude is proportional to the number counted by said counter at any instant of time, the latter D.C. voltage forming said slowly varying control voltage.

7. A system as claimed in claim 1, in which said phase-controlling means for said main carrier current comprise a first monostable triggered by the output of a filter circuit energized by said transmitted carrier current; in which the length of the signals produced by the triggering of the first monostable is controlled by said slowly varying control voltage; and in which said first monostable acts by way of the trailing edge of said triggered signals to control a second monostable delivering fixedlength signals having substantially a length equal to $1/2f_0$, the sequence of the last-mentioned signals forming said phase-controlled main carrier current.

8. A system as claimed in claim 7, in which said filter circuit energized by said transmitted carrier current comprises in cascade connection a filter having a narrow passband centered on frequency $f_0$ followed by an amplifier and an amplitude limiter.

* * * * *